United States Patent [19]

Anderson et al.

[11] 3,724,739

[45] Apr. 3, 1973

[54] APPARATUS FOR FREQUENCY ADJUSTING AND ASSEMBLING MONOLITHIC CRYSTAL FILTERS

[77] Inventors: Albin R. Anderson, Lowell; John D. Jennings, Andover; Walter E. Killerby, Lowell, all of Mass.

[73] Assignee: Western Electric Company, New York, N.Y.

[22] Filed: June 15, 1972

[21] Appl. No.: 263,077

Related U.S. Application Data

[62] Division of Ser. No. 80,093, Oct. 12, 1970, Pat. No. 3,696,986.

[52] U.S. Cl. ....................228/3, 29/25.35, 29/203 D, 29/470.1, 72/345, 72/427

[51] Int. Cl. ............................................B23k 21/00

[58] Field of Search......29/25.35, 203 D, 470.1, 592, 29/505; 228/3; 100/218; 72/344, 345, 427

[56] References Cited

UNITED STATES PATENTS

| | | | |
|---|---|---|---|
| 3,634,934 | 1/1972 | Fitzgerald | 228/3 X |
| 3,418,839 | 12/1968 | Hlavac | 72/344 |
| 3,242,555 | 3/1966 | Weber | 29/470.1 X |
| 3,157,111 | 11/1964 | Andersen | 100/218 |
| 2,960,949 | 11/1960 | Smith et al. | 72/345 |
| 2,901,995 | 9/1959 | Lavigne | 72/344 |
| 2,261,304 | 11/1941 | Sparks | 72/344 |
| 1,294,486 | 2/1919 | Kuen | 29/505 X |

*Primary Examiner*—J. Spencer Overholser
*Assistant Examiner*—Robert J. Craig
*Attorney*—W. M. Kain et al.

[57] ABSTRACT

Sealed piezoelectric crystal devices with desired frequency response characteristics are manufactured by treating and sealing each crystal in a vacuum environment within a common apparatus housing. Vapor deposition treatment is utilized, with treating material replenishing mechanisms being positioned within the vacuum environment in order to avoid disturbing the vacuum environment during replenishing operations. Sealing is performed by cold weld sealing a pair of covers about each treated crystal device. The arrangement is designed to minimize alterations in the crystal frequency response characteristics subsequent to the vapor deposition treatment.

A die stripping device for ejecting each sealed article from two article-forming, cold weld sealing dies is incorporated entirely into the dies. An ejector on a bottom die is activated during sealing by an actuator of a top die. Ejection of the article from the bottom die then occurs upon die separation. The apparatus also includes a pair of turntables which overlap peripherally at a sealing station within the housing. A loading and unloading station, for introducing top covers and crystals into upper sealing dies and removing sealed crystal filter assemblies from the apparatus, and a vapor deposition crystal treating station are arrayed about one turntable. Manual and automatic loading stations for loading bottom covers into lower sealing dies are arrayed about the other turntable. Also included in the apparatus are various loading and unloading mechanisms and associated air-lock arrangements at the different stations.

6 Claims, 14 Drawing Figures

APPARATUS FOR FREQUENCY ADJUSTING AND ASSEMBLING MONOLITHIC CRYSTAL FILTERS

CROSS-REFERENCE TO COPENDING APPLICATION

This is a division, of application Ser. No. 80,093 filed Oct. 12, 1970 now U.S. Pat. No. 3,696,986.

This application is similar to an application of A. R. Anderson and J. D. Jennings for Methods and Apparatus for Treating a Workpiece, Ser. No. 80,094, now U.S. Pat. No. 3,691,720, filed concurrently herewith.

BACKGROUND OF THE INVENTION

This invention relates to cold weld bonding apparatus and, more particularly, to apparatus including dies for cold weld bonding articles and incorporating mechanisms for ejecting articles from the dies after bonding.

In the manufacture of various sealed articles, e.g., sealed crystal filter assemblies and other devices, it is often necessary that each finished article have certain desired electrical properties, e.g., particular frequency response characteristics. The article may include a component which has been treated to provide such properties. The sealing of the treated component within a casing will thereafter protect the component from the effects of the surrounding atmosphere, preserving the properties which have been acquired by the treated component.

The handling of a treated component prior to the performance of a sealing operation may, however, cause an alteration in the properties of interest due to contamination. Moreover, the sealing operation may, itself, result in changes in the properties of the treated component.

Apparatus for treating and sealing such a component to form a finished article having the desired properties must provide for treatment and sealing under controlled environmental conditions. A sealing operation must be selected such that component deteriorating effects, e.g., high temperatures, are substantially eliminated. The sealing operation and the various associated operations, such as die stripping or article ejecting must be capable of performance within the necessary controlled environment in simple, quick, effective and reliable manner.

SUMMARY OF THE INVENTION

An object of the invention resides in new and improved apparatus for cold weld bonding one or more articles.

The invention contemplates the utilization of cold weld bonding apparatus in forming an article by treating a component and then cold weld sealing housing members about the treated component within a controlled environment. Cold weld bonding is selected as an article forming and sealing operation in order to eliminate substantially all effects, e.g., high temperatures, which might cause deterioration in desired properties of the housed component, such as in frequency response characteristics of a piezoelectric crystal device.

Cold weld bonding apparatus provided in accordance with the invention utilizes a pair of dies for sealing the housing members together. Article stripping mechanisms for ejecting the sealed article from the dies are contained entirely within the pair of dies. An ejector on a bottom die is activated during sealing by an actuator of a top die. Ejection of the article from the bottom die then occurs upon die separation. This arrangement not only provides a compact, efficient and reliable structure, one which is interchangeable with the substitution of new dies into the apparatus for producing different articles, but also is well adapted to sealing an article within a controlled environment in that no die stripping actuating mechanisms external of the sealing dies are necessary.

DETAILED DESCRIPTION

General Outline of Apparatus for Manufacturing Sealed, Treated Articles

Figure 8:
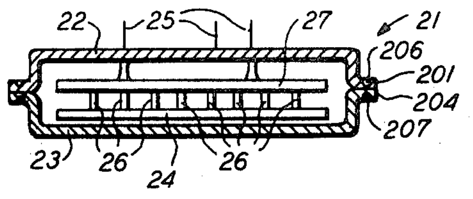
FIG. 8 is vertical elevational view, with parts broken away, of a typical finished article which may be manufactured by the apparatus of the drawing.

With reference to the drawing, there is illustrated apparatus for manufacturing sealed monolithic crystal filter assemblies 21 (FIG. 8) or other devices with desired frequency response characteristics. Each article 21 includes two enveloping sections, constituting rectangularly shaped, flanged top and bottom covers 22 and 23, which are sealed together to form a casing about a treated crystal plate 24, e.g., a quartz crystal plate. Leads 25,25 extend outwardly from the top cover 22. The plate 24 is mounted to first ends of a number of support bars 26, which support bars are mounted at their opposite ends to a ceramic support plate 27 carried by the top cover 22. In actual use, the assembly 21 will normally be mounted inverted from the position depicted in FIG. 8 such that the leads 25,25 extend downwardly.

Figure 1:
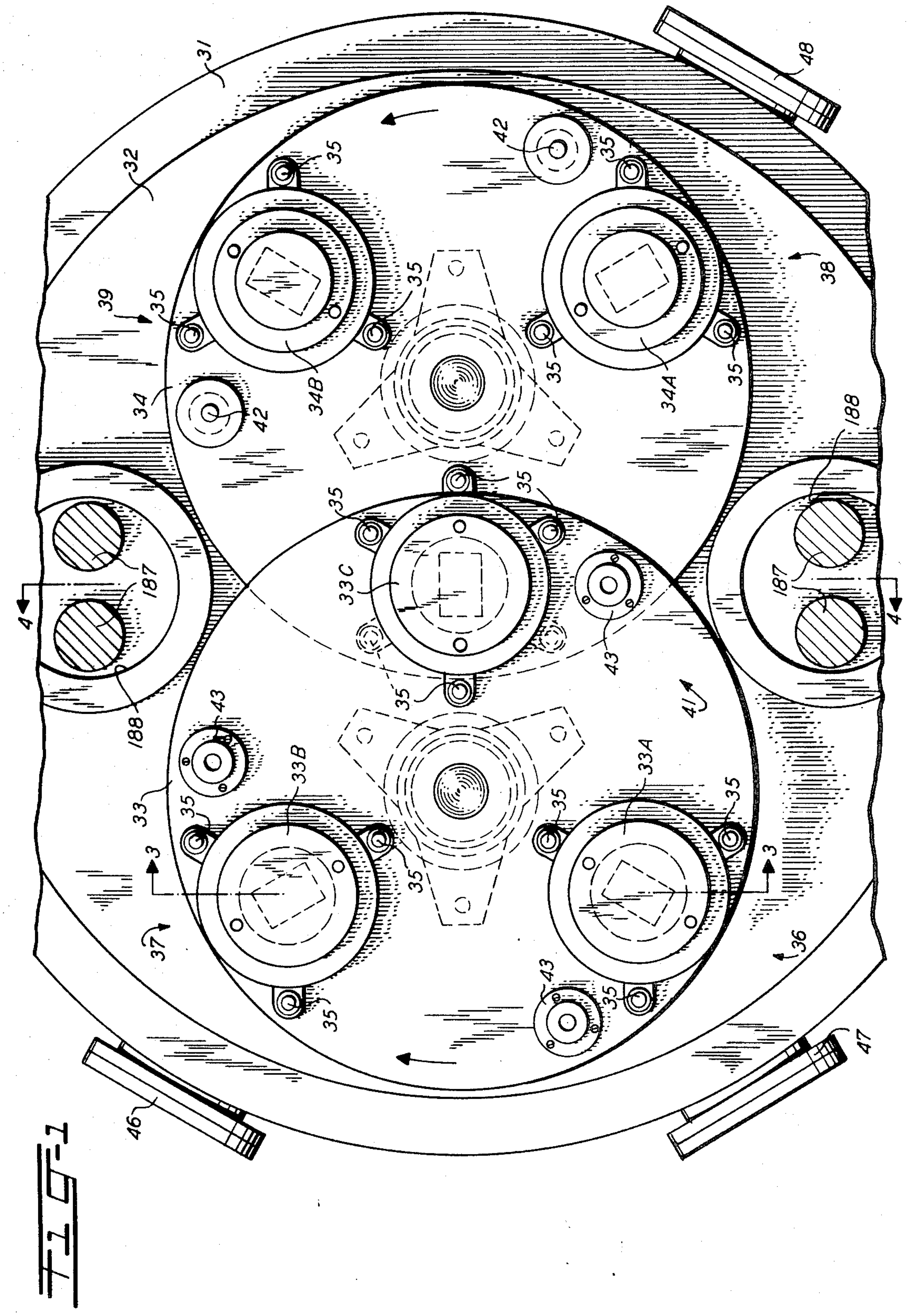
FIG. 1 is a plan view of apparatus constructed in accordance with the principles of the invention for manufacturing sealed, treated articles, such as monolithic crystal filter assemblies having desired frequency response characteristics.
Figure 2:
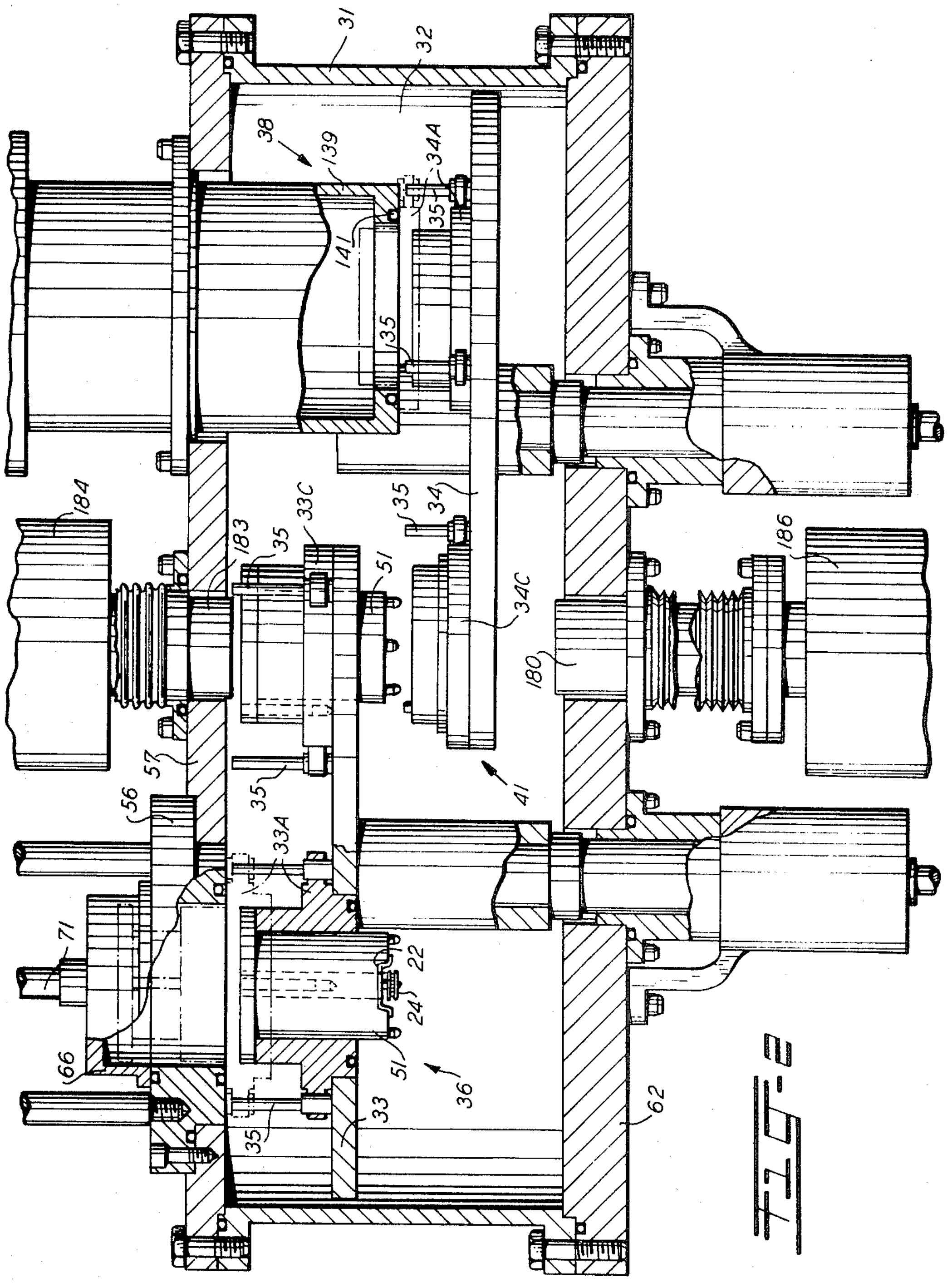
FIG. 2 is a front elevational view, showing portions of the apparatus including upper and lower turntables in a sealed vacuum chamber.

The apparatus, as best shown in FIGS. 1 and 2, includes a cylindrical housing 31 which encloses a sealed vacuum chamber or main working chamber 32. The chamber 32 contains an upper and a lower turntable 33 and 34 each including three nests 33A–33C and 34A–34C, spaced at equal intervals about the turntable periphery. Each nest is vertically movable on its turntable 33 or 34 along a number of guide columns 35,35.

Five operating stations are present in the apparatus. A loading and unloading station 36 and a crystal treating station 37 are associated with the upper turntable 33. A manual loading station 38 and an automatic loading station 39 are associated with the lower turntable 34. The two turntables 33 and 34 overlap at a sealing station 41. The turntables are operable in conventional manner to index intermittently the nests 33A–33C and 34A–34C sequentially through the respective associated stations. Suitable turntable locking mechanisms, such as downwardly-biased plungers 42 (FIGS. 1 and 4), plunger receivers 43 and an upwardly movable ram 44, the ram located at the sealing station 41, will be utilized to lock the turntables temporarily, once each nest is positioned in each successive station.

The housing 31 is provided with a number of observation and service ports 46, 47, 48 (FIG. 1). Conventional mechanisms, such as vacuum pumping equipment (not shown), are adapted to control the environment within the vacuum chamber 32. From the time each part 22,23 etc., is introduced into the vacuum chamber, through the time that the parts are assembled into a sealed article 21 and continuing through the time that the finished article is removed from the vacuum chamber, the parts and the article will be exposed only to the controlled environment. The controlled environment will, thus, be present within the sealed article 21 to provide a desired surrounding atmosphere for the treated crystal plate 24.

The Loading and Unloading Station 36

Various mechanisms located at the loading and unloading station 36 are illustrated in FIGS. 3 and 9 through 11 of the drawing. At station 36, there will be mounted onto each successively indexed one of three upper die members 51 (FIG. 5), each associated with a different nest 33A, 33B or 33C, a top cover 22 (FIG. 8) carrying a crystal plate 24 on a support plate 27. At the loading and unloading station 36, further, there will be unloaded from each successive upper die 51 a treated and sealed monolithic crystal filter assembly 21.

Figure 3:
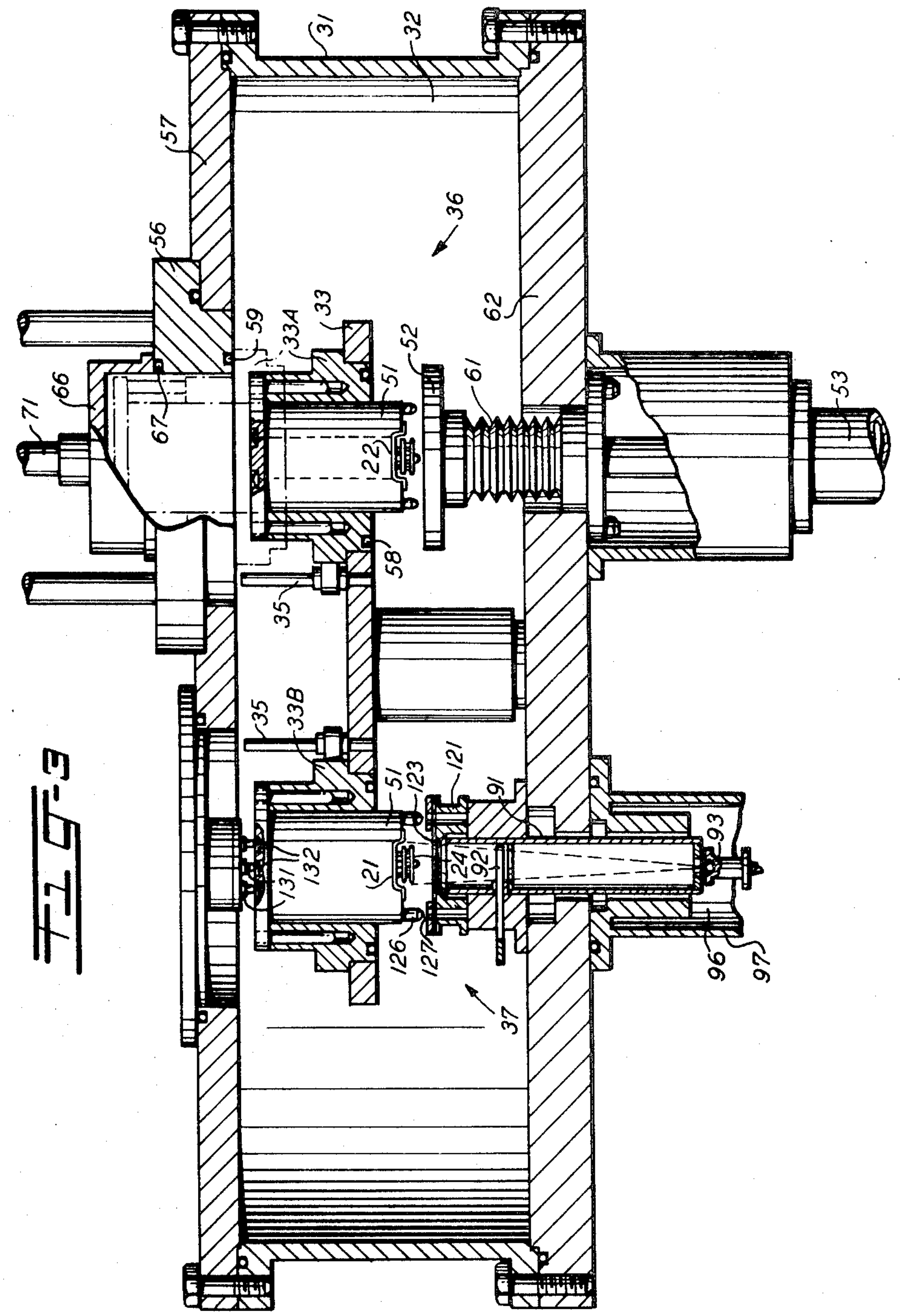
FIG. 3 is a left side elevational view, taken partly in section along the line 3—3 in FIG. 1, illustrating a crystal treating station and a loading and unloading station location within the vacuum chamber of the apparatus.

A lifting platform 52 is normally maintained in a withdrawn position beneath the upper turntable 33 in the station 36, as shown in FIG. 3. A fluid cylinder assembly 53 is adapted to raise the lifting platform 52 from its FIG. 3 position to that shown in FIG. 9. A suitable aperture 54 (FIG. 9) is located beneath each nest 33A–33C to permit upward passage of the lifting platform 52 through the upper turntable 33. The rising lifting platform will pick up the particular nest, e.g., 33A which has just been indexed into the station 36 and lift the nest along the guide columns 35,35. The lifting platform 52 will bring the nest 33A into contact with a sealing cover 56 positioned at the station 36 above the upper turntable 33 in a top plate 57 of the housing 31.

Two ring seals 58 and 59 are located in the nest 33A and the sealing cover 56, respectively. A bellows seal 61 is associated with the operation of the fluid cylinder assembly 53 at a bottom plate 62 of the housing 31. The seals 58,59 and 61 are adapted to keep the vacuum chamber 32 sealed against the outside atmosphere during various of the operations at the loading and unloading station 36.

A sealing head 66 normally rests on a top surface of the sealing cover 56. The sealing cover includes a ring seal 67. The ring seal 67 is adapted to cooperate with the sealing head 66 to keep the vacuum chamber 32 sealed against the outside atmosphere whenever the ring seals 58 and 59 are not simultaneously contacting the lifting platform 52 and the nest 33A, respectively. Thus, the vacuum chamber will remain sealed at all times such that the environment control mechanisms (not shown) may provide the desired environment within the vacuum chamber during continuing operation of the apparatus.

The space defined between the lifting platform 52, the nest 33A, the sealing cover 56 and the sealing head 66, when sealed at the ring seals 58,59 and 67, forms an air-lock cavity 68. The air-lock 68 may be brought rapidly to a controlled environment state through operation of conventional equipment (not shown) in order that the surrounding atmosphere will not enter into the vacuum chamber 32 upon each lowering of the lifting platform 52.

Figure 11:
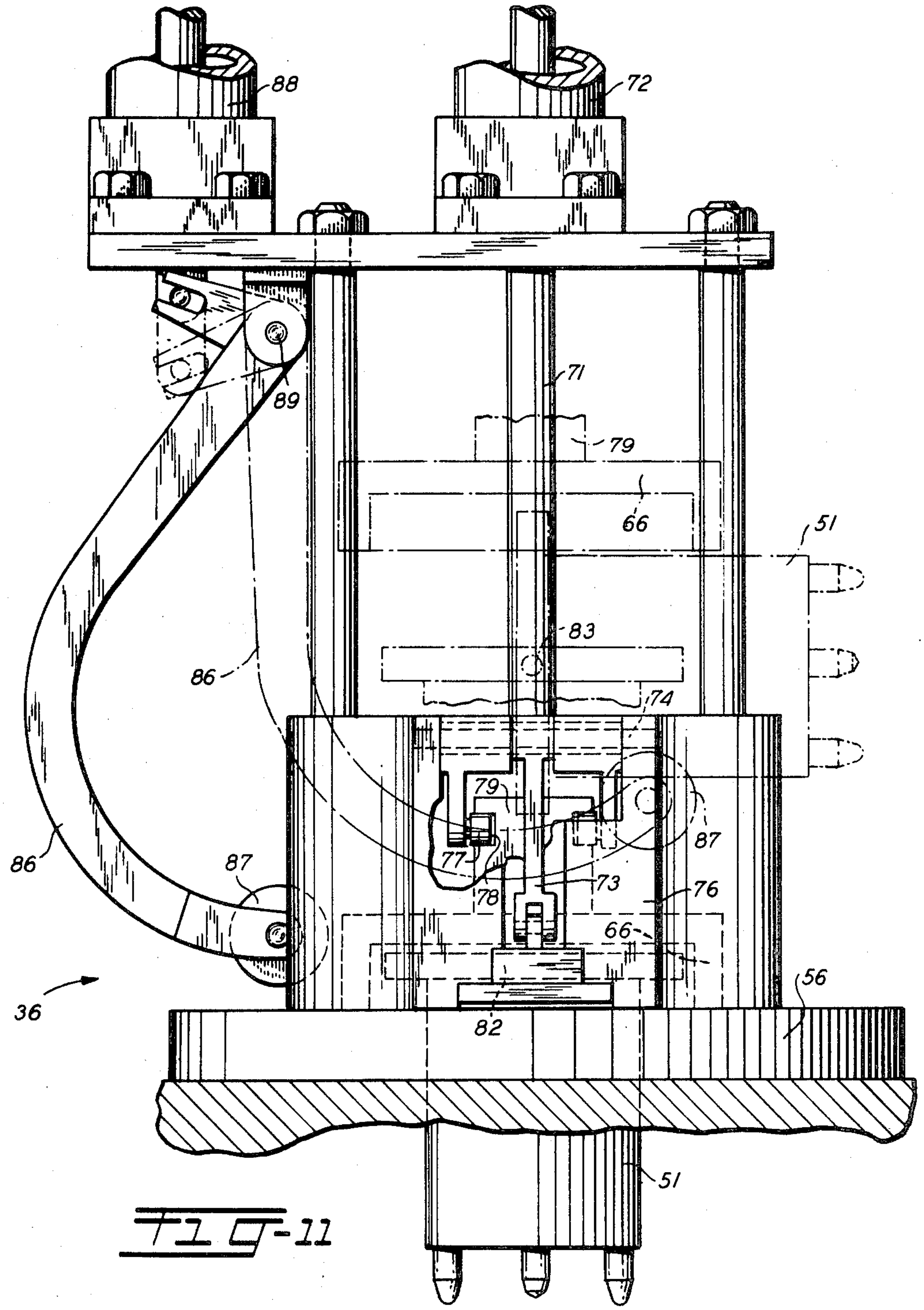
FIG. 11 is a side elevational view, taken perpendicularly to the view of FIG. 9, illustrating additional aspects of the loading and unloading mechanisms.

A lifting rod 71 is connected to be moved vertically by operation of a fluid cylinder assembly 72 in order to raise and lower the sealing head 66. A pair of levers 73,73 are mounted to pivot pins 74,74 in slotted blocks 76,76. Each lever 73 carries a pair of follower rollers 77,77 at one end. Each follower roller is mounted for horizontal movement in one or the other of two slideways 78,78 in an actuating block 79, as best shown in FIG. 11. The actuating block 79 is mounted on the sealing head 66 to be moved vertically with the sealing head upon vertical movement of the lifting rod 71.

A horizontal aperture 81 is located in each slotted block 76 beneath the respective pivot pin 74. A lifting finger 82 is housed in each aperture 81 for sliding movement toward and away from the sealing head 66. Each lever 73 is in engagement with a different one of the lifting fingers 82,82 at an end of the lever opposite to that which carries the follower rollers 77.

Figure 9:
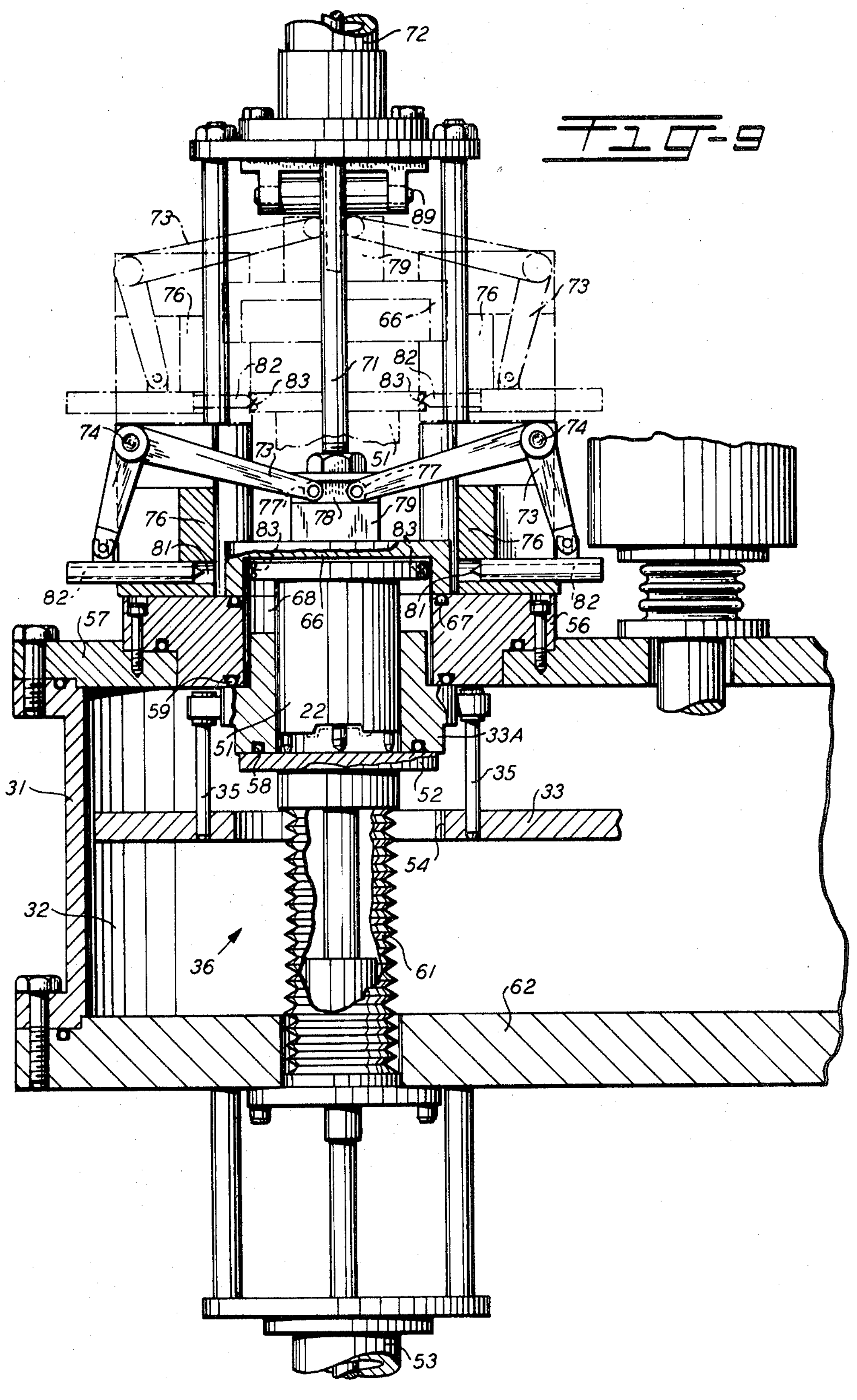
FIG. 9 is a vertical elevational view, showing loading and unloading mechanisms located at the loading and unloading station of the apparatus.

The arrangement is such that an initial upward movement of the lifting rod 71 will lift the sealing head 66 from the solid line position shown in FIG. 9. At the same time, the follower rollers 77,77 will be moved upwardly by the upward movement of the actuating block 79. With the slotted blocks 76 resting upon the sealing cover 56, the levers 73,73 will be pivoted about the pins 74,74 to move the lifting fingers 82,82 inwardly beneath the raised sealing head 66 and into gripping contact with a pair of appropriately positioned centering bearings 83,83 forming part of the upper die 51. Since further inward movement of the lifting fingers will then be blocked, continued upward movement of the lifting rod 71 into the phantom line position of FIG. 9 will cause combined upward movement of the sealing head 66, the actuating block 79, the levers 73,73, the slotted blocks 76,76 the lifting fingers 82,82 and the upper die 51. Downward movement of the lifting rod 71 will provide a reversal of the lifting operation, placing the upper die 51 onto the raised lifting platform 52 and the sealing head 66 onto the sealing cover 56.

A pusher lever 86 (FIGS. 10 and 11) carries a pusher roller 87 at one end. The roller 87 is shaped for engagement with a side surface of a lifted upper die 51 beneath the raised sealing head 66. A fluid cylinder assembly 88 is connected to pivot the pusher lever 86 about a pivot pin 89. Such movement of the pusher lever 86 will cause the pusher roller 87 to engage the upper die 51 and pivot the upper die through an arc of 90° while held by the lifting fingers 82,82 engaging the centering bearings 83,83. Thus, the upper die 51 will assume the phantom line position of FIG. 11, permitting simplified manual or automatic loading and unloading operations from a location at the edge of the upper turntable 33 adjacent to the loading and unloading station 36.

Figure 10:
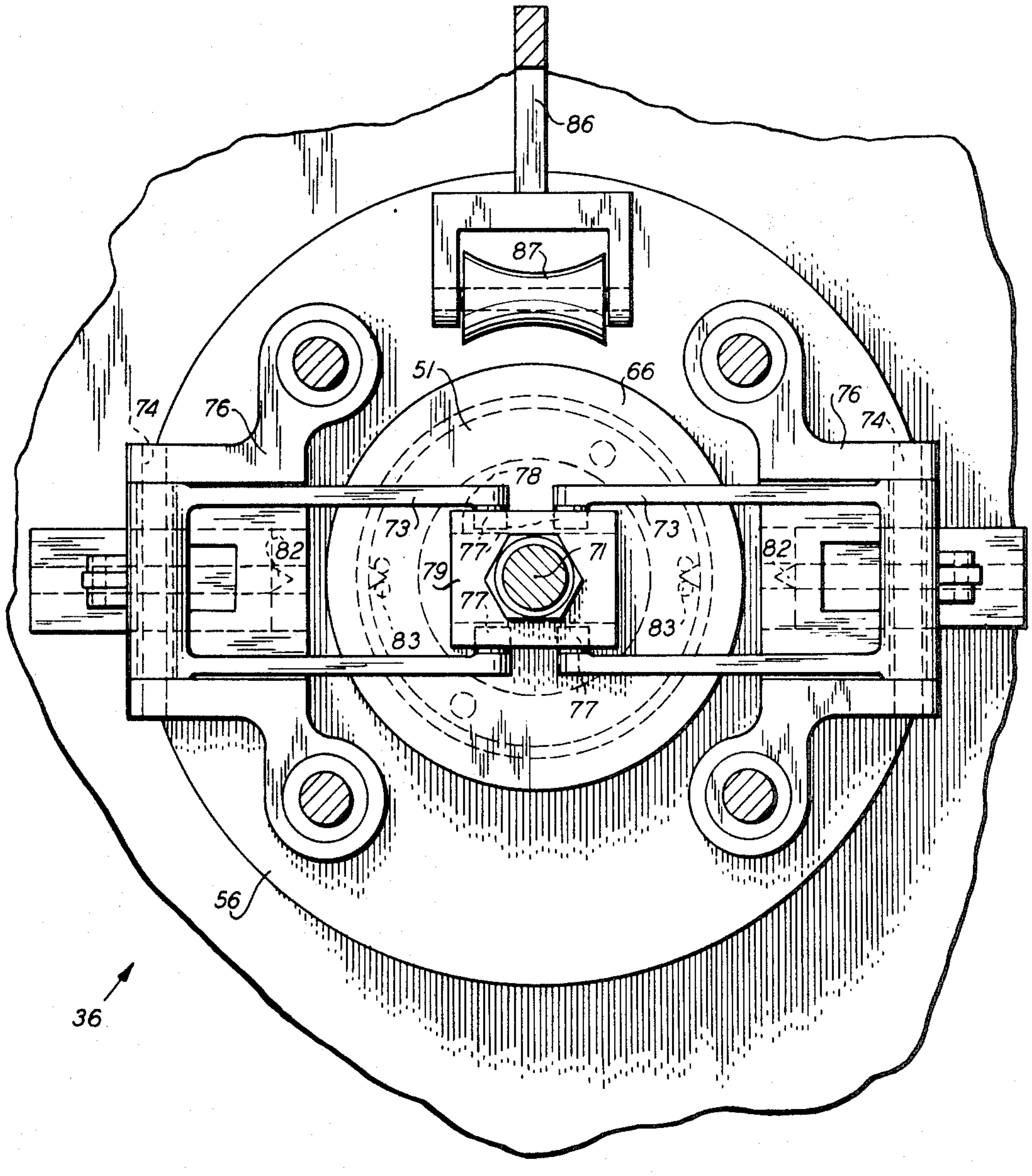
FIG. 10 is a plan view of portions of the loading and unloading mechanisms.

Thereafter, sequential reversals in the operations of the fluid cylinder assemblies 88 and 72 will return the apparatus to the condition depicted in solid lines in FIGS. 9–11, whereupon, after an environmental control operation upon the sealed air-lock cavity 68, a reversal in the operation of the air cylinder 53 will lower the lifting platform 52 through the aperture 54 and into the normal position of the lifting platform beneath the upper turntable 33 (FIG. 3).

The Crystal Treating Station 37

Figure 12:
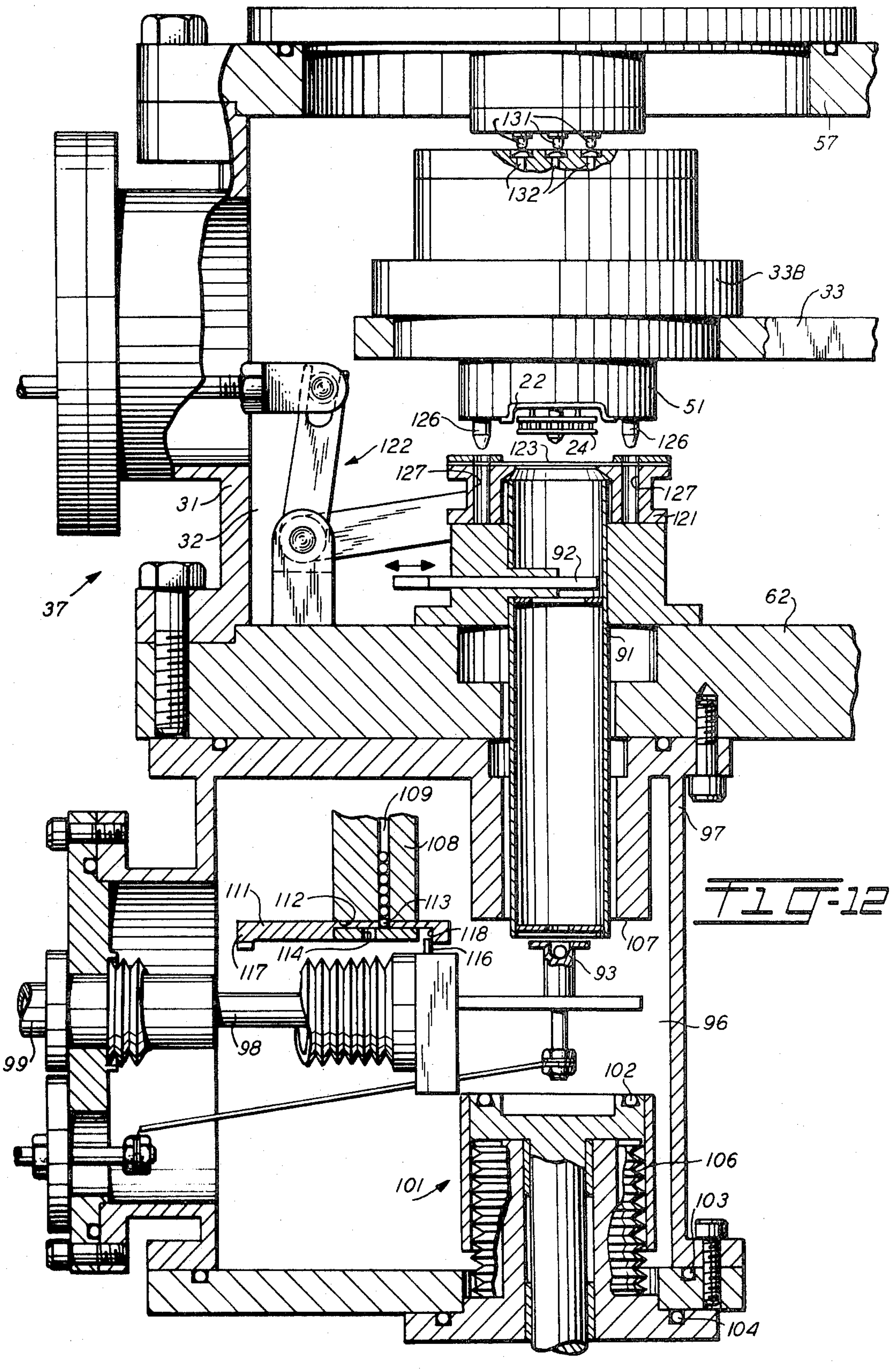
FIG. 12 is a front elevational view, taken perpendicularly to the view depicted in FIG. 3, showing crystal treating mechanisms located at the crystal treating station of the apparatus.

Turning next to FIGS. 3 and 12 of the drawing, various mechanisms associated with the crystal treating station 37 are illustrated. It is desired that each crystal plate 24 exhibit a predetermined frequency response characteristic. Frequency response characteristics are to be altered toward the desired value by a vacuum deposition treatment at the station 37. A treating material, e.g., gold, will be deposited onto a surface of the crystal plate in order to vary the mass of the crystal plate until the required frequency response characteristic value is measured. Thereupon such treatment will be terminated.

A vapor deposition collimator 91 is mounted extending vertically through the bottom plate 62 of the housing 31 at the crystal treating station 37. The axis of the collimator is directed upwardly toward the upper turntable 33. A shutter plate 92 is movable in a radial direction across the collimator 91 under the influence of a fluid cylinder assembly (not shown) in order to block or unblock selectively a vapor deposition path along the collimator. A boat or carrier 93 is mounted at the base of the collimator 91. The boat is adapted to hold pellets of the material to be vapor deposited onto successively treated crystal plates 24 on the upper turntable 33. The boat constitutes a resistance heater for heating each pellet held in the boat. Such heating will cause the treating material to evaporate and pass along the collimator toward the upper turntable 33. Alternatively, a commercially available, large volume electron beam gun might be utilized in place of the boat 93.

The boat 93 and a lower portion of the collimator 91 are located in an auxiliary vacuum chamber 96 of the apparatus. The auxiliary vacuum chamber, which is defined within an auxiliary housing 97 mounted to the bottom plate 62 of the housing 31, is normally fluid-connected to the vacuum chamber 32 such that the chambers 32 and 96 normally form a common, sealed treating zone. The boat 93 is mounted on a plunger 98 (FIG. 12) for horizontal movement out of alignment with the collimator 91 upon actuation of a fluid cylinder assembly 99.

An auxiliary air-lock assembly 101 includes ring seals 102,103 and 104 and a bellows seal 106. When the boats 93 and 94 are displaced out of alignment with the collimator 91, i.e., to the left as viewed in FIG. 12, the auxiliary air-lock assembly 101 may be raised so as to place the ring seal 102 in tight, sealing engagement with an inner wall surface 107 of the auxiliary housing 97 surrounding the lower portion of the collimator 91. At such time, the auxiliary vacuum chamber 96 may be exposed momentarily to atmospheric conditions, e.g., for maintenance purposes or to introduce a number of pellets of the treating material into a magazine 108 in the auxiliary vacuum chamber. Thereafter, the auxiliary vacuum chamber may again be sealed against the surrounding atmosphere and exposed to the controlled environment through operation of conventional equipment (not shown). The auxiliary air-lock assembly 101 may then be lowered away from the surface 107 and the plunger 98 extended to the right in FIG. 12 to return the apparatus to its normal, FIG. 12 condition.

The magazine 108 includes a vertical slot 109 for housing a number of pellets of the treating material. A dispensing slide 111 passes horizontally through a slideway 112 in a lower portion of the magazine 108. The slide 111 includes an aperture 113 normally positioned beneath the slot 109. Another aperture 114 passes vertically through the lower portion of the magazine beneath the slideway 112 in a position slightly out of alignment with the aperture 113. A peg 116 is mounted for horizontal movement with the plunger 98 and is aligned to engage two opposed inner wall surfaces 117 and 118 at opposite ends of the slide. The arrangement is such that the fluid cylinder assembly 99 may be actuated to move the boat or carrier 93 and the peg 116 together to the left in FIG. 12. As the peg 116 engages the surface 117 of the slide 111, the slide will be moved to the left to align the aperture 113 with the aperture 114. A single pellet housed in the aperture 113 will be dropped through the aperture 114 and into the boat 93, appropriately aligned beneath the aperture 114, to replenish the supply of treating material in the boat. The boat 93 and peg 116 may then be returned to their normal, FIG. 12, positions, the peg 116 driving the slide 111 so as to again align the aperture 113 with the slot 109 to receive another pellet.

A masking assembly 121 is mounted at the end of the collimator 91 within the vacuum chamber 32. A linkage 122 is actuable by a fluid cylinder assembly (not shown) to lift the masking assembly 121 into contact with an upper die 51 located in a nest, e.g., nest 33B, in the crystal treating station 37. Such action of the linkage 122 will place a mask 123 over the crystal plate 24 in the upper die 51 so that vapor plating will occur on the crystal plate only in selected areas exposed by the mask 123. A number of dowels 126,126 on the upper die 51 will each be received in a different one of a like number of apertures 127,127 in the masking assembly 121 to align the mask with the crystal plate 24.

A number of electrical probes 131,131 are mounted above the upper turntable 33 at the crystal treating station 37. These are positioned to engage testing terminals 132,132 (FIGS. 5 and 12) mounted at the top of the upper die 51. The upper die includes passages 133,133 for crystal plate leads (not shown) and various connecting wires 134,134 which will couple the crystal plate 24 retained in the upper die 51 electrically to the testing terminals 132,132. Suitable testing and control equipment (not shown), incorporating the probes 131,131 is positioned at the crystal treating station for controlling the vapor deposition operation. Such testing and control equipment may be of a type disclosed in U.S. Pat. application Ser. No. 889,211 of R. P. Grenier, filed Dec. 30, 1969, concerning a Method and System for Adjusting Electrical Components.

The Manual Loading Station 38

Figure 13:
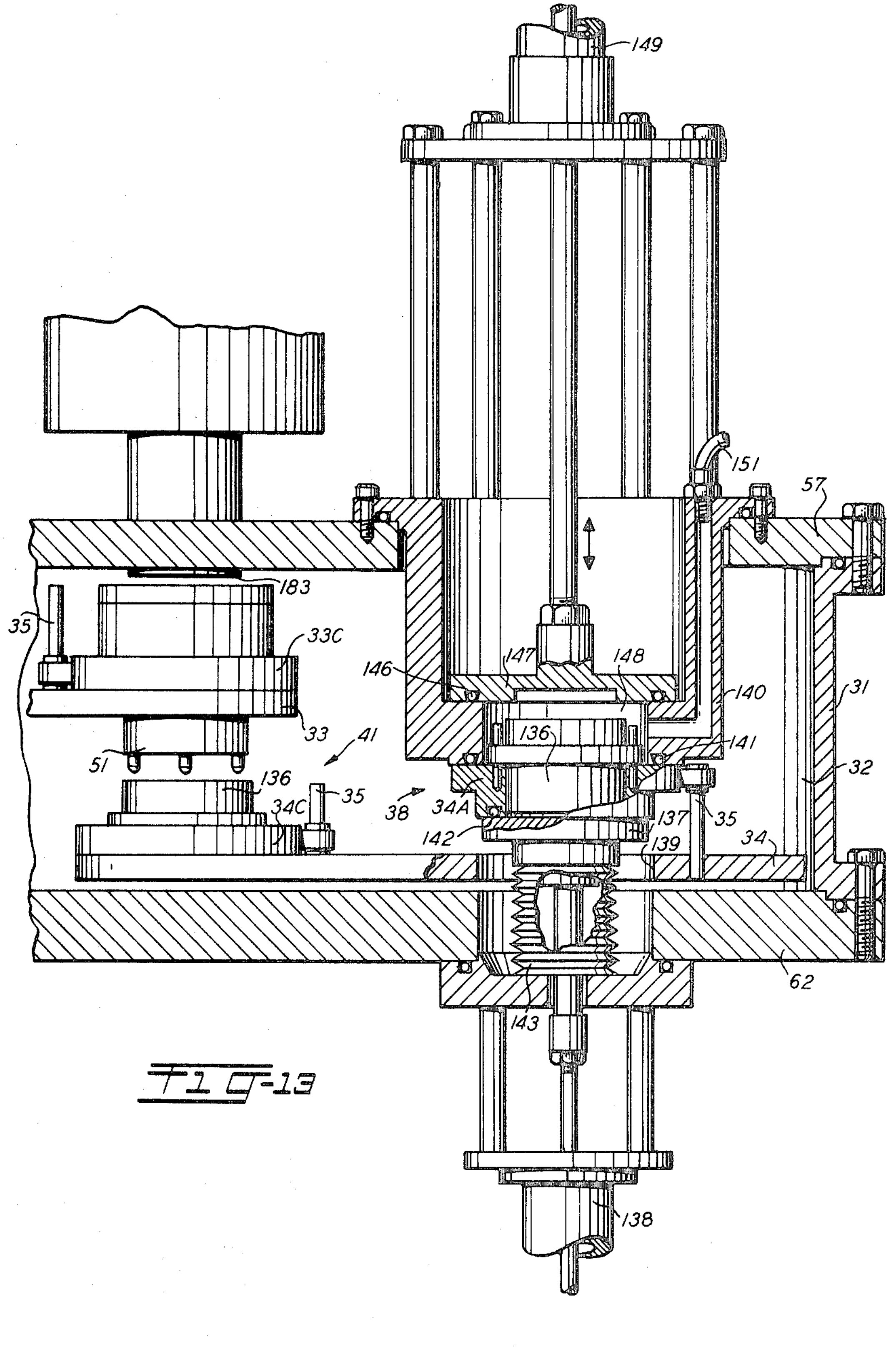
FIG. 13 is a vertical elevational view, with parts broken away, showing a manual loading station located within the vacuum chamber of the apparatus.

Loading mechanisms associated with the manual loading station 38 are depicted in FIG. 13. At the manual loading station a bottom cover 23 (FIG. 8) may be loaded manually into each of the nests 34A–34C in the lower turntable 34 which is to be utilized in the production of a sealed, monolithic crystal filter assembly 21. Each nest 34A–34C includes a lower die member 136 (FIG. 5) normally mounted in the nest. The manual loading station 38 is ordinarily to be utilized in place of the automatic loading station 39 to load bottom covers into the lower die 136 in one or more of the nests 34A–34C only in those instances in which a very small number of articles 21 are to be produced.

Located at the manual loading station 38, in a normal rest position beneath the lower turntable 34, is a lifting platform 137. A fluid cylinder assembly 138 is adapted to raise the lifting platform 137 toward the position shown in FIG. 13. A suitable aperture 139 is located beneath each nest 34A–34C to permit upward passage of the lifting platform 137 through the lower turntable 34. The rising lifting platform will pick up the particular nest, e.g., 34A which is located at the manual loading station 38 and lift the nest along the guide columns 35,35. The lifting platform 137 will bring the nest 34A into contact with a recessed sealing cover 140 positioned at the station 38 and extending downwardly from the top plate 57 of the housing 31 toward the lower turntable 34.

Ring seals 141 and 142 and a bellows seal 143 are adapted to seal the vacuum chamber 32 against the surrounding atmosphere when the lifting platform 137 is raised into the FIG. 13 position. A ring seal 146 in a sealing head 147 will cooperate with the ring seals 141 and 142 to seal an air-lock cavity 148 from both the vacuum chamber 32 and the surrounding atmosphere when the apparatus is in the condition depicted in FIG. 13.

Figure 6:
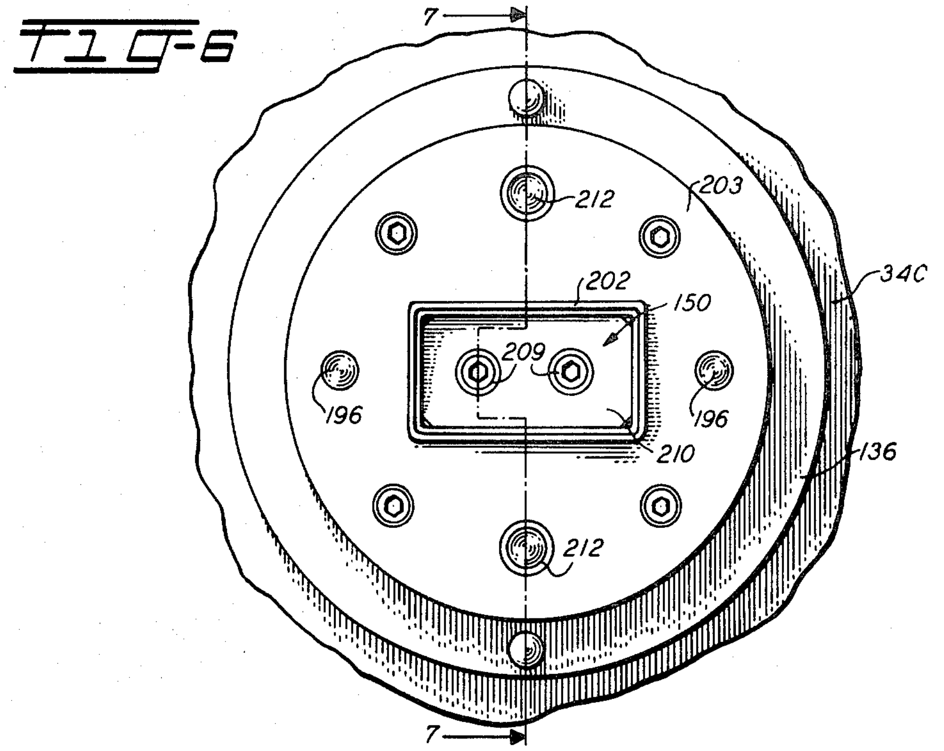
FIG. 6 is a plan view of the lower die member, as observed along the line 6—6 in FIG. 5.

A fluid cylinder assembly 149 is connected to raise and lower the sealing head 147. With the sealing head raised clear of the recessed sealing cover 140, a bottom cover may be manually pressed into a receiving aperture 150 (FIG. 6) in the lower die 136 which is supported in the raised nest 34A. The sealing head 147 may then be returned in its FIG. 13 position and conventional equipment (not shown), coupled to a fluid hose 151, may be employed to control the environment in the sealed air-lock 158. Thereafter, the lifting platform 137 may be returned to its normal rest position beneath the lower turntable 34 and the nest 34A indexed toward the automatic loading and sealing stations 39 and 41.

The Automatic Loading Station 39

Figure 14:
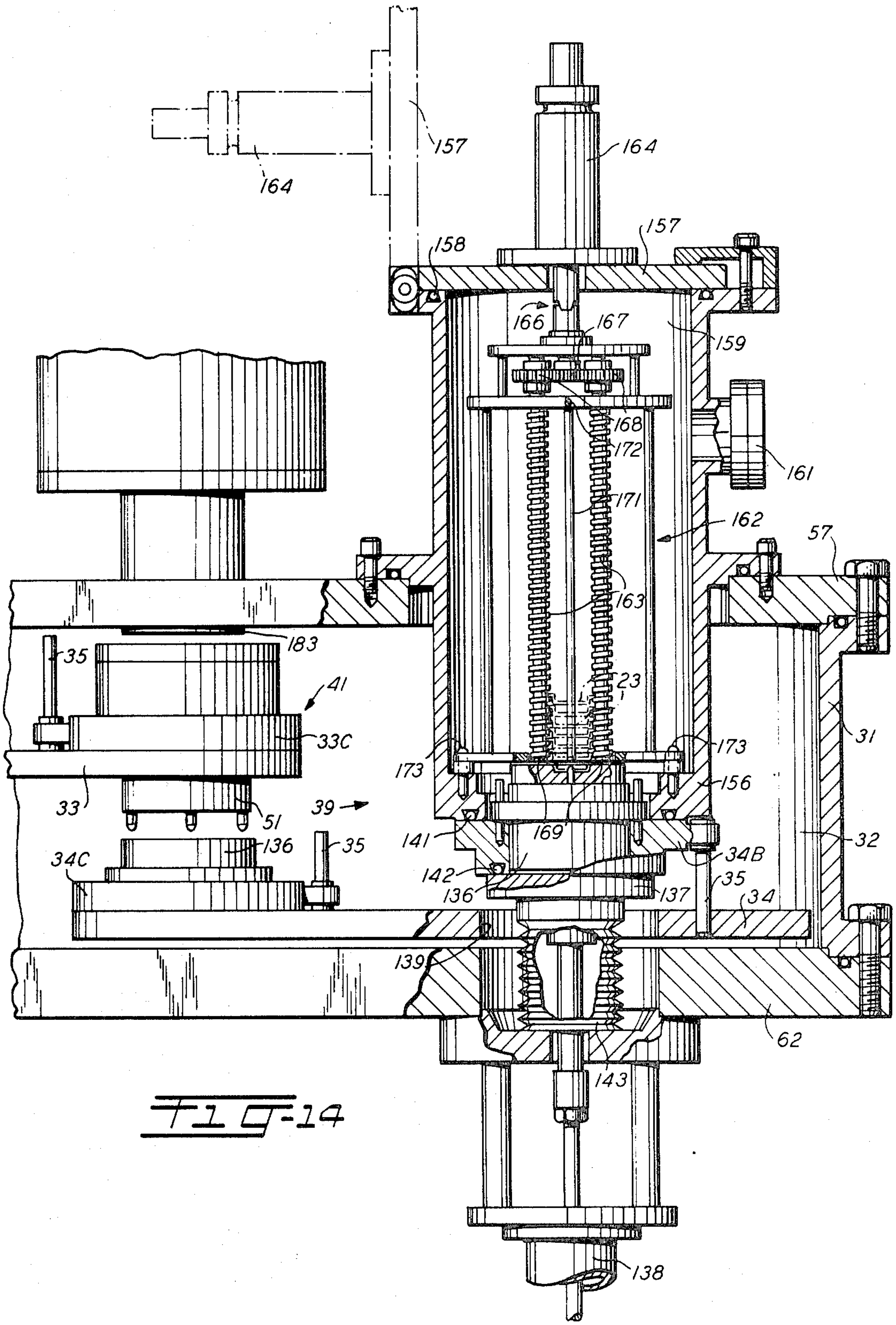
FIG. 14 is a vertical elevational view, with parts broken away, illustrating an automatic loading station located within the vacuum chamber of the apparatus.

Turning now to FIG. 14 of the drawing, various mechanisms associated with the automatic loading station 39 are illustrated. The automatic loading station is to be employed, rather than the manual loading station 38, in the normal operation of the apparatus, i.e., when an appriciable number of sealed, monolithic crystal filter assemblies 21 are to be manufactured. The positions of the stations 38 and 39 are, obviously, interchangeable in the apparatus.

Certain portions of the mechanisms mounted at the automatic loading station 39 are substantially identical to analogous elements located at the manual loading station 38, and, thus, already described. Such like portions of the mechanisms at the two stations, which operate in like manner, have been given identical reference numerals in FIGS. 13 and 14. Among these like elements are the lifting platform 137 and the associated fluid cylinder assembly 138.

A recessed sealing cover 156 is mounted on the top plate 57 of the housing 31 at the automatic loading station 39. The recessed sealing cover 156 differs from the recessed sealing cover 140 at the manual loading station 38 in that the cover 156, in addition to providing a downward extension toward the lower turntable 34 in the vacuum chamber 32, extends upwardly for an appriciable distance above the top plate 57 of the housing 31. The recessed sealing cover 156 forms, in cooperation with a pivotable sealing head 157 and a ring seal 158, an air-lock cavity 159 which may be coupled through a fitting 161 to conventional environmental control equipment (not shown).

A bottom cover magazine and feeding assembly 162 is positioned within the air-lock cavity 159 in the recessed sealing cover 156. The magazine assembly 162 includes four vertically extending lead screw members 163,163 of like pitch, disposed such that a vertical column of bottom covers 23 may be supported by the flange of each cover engaging and resting upon the threads of all four of the lead screws simultaneously.

A drive motor 164 for the assembly 162 is mounted on the sealing head 157 to pivot with the head. A drive coupling 166 couples the drive motor 164 to rotate a drive gear 167 when the apparatus is in the normal, solid line condition of FIG. 14. Four driven gears 168,168 are mounted to respective ones of the lead screws 163,163 to be rotated in like direction upon rotation of the drive gear 167.

The arrangement is such that intermittent operations of the drive motor 164, with the apparatus in the solid line condition of FIG. 14, will each rotate the lead screws 163,163 through one rotation, thereby feeding the bottom covers 23 supported on the lead screw threads downwardly by one position through a distance corresponding to the pitch of the lead screws. Appropriately designed camming surrounds 169,169 at the bottoms on the lead screws will press the bottommost cover 23 firmly into the receiving aperture 150 (FIG. 6) of a lower die 136 in an aligned nest, e.g., 34B in the automatic loading station 39. Intermittent operations of the drive motor 164 are coordinated by conventional control mechanisms (not shown) so as to load a new bottom cover 23 into each successive nest 34A–34C indexed into the station 39.

A number of vertically extending rods 171 are positioned in the assembly 162 adjacent to the lead screws 163,163 in order to restrain the bottom covers 23 against any movement away from the lead screws in a horizontal direction. At least one of the rods 171 is mounted, e.g., by means of one or more locking screws 172, to be readily removed from a bottom cover retaining position. Rod removal will simplify loading of the bottom covers 23 into position between the threads of the lead screws 163,163 upon a lifting of the magazine assembly 162 out of the cavity 159. With such rod 171 removed, the bottom covers may be slid horizontally into the magazine assembly such that the flanges of the bottom covers rest on the lead screw threads, whereupon the removed rod 171 may be replaced.

Lifting of the magazine assembly 162 out of the cavity 159, e.g., manually, in order to load the magazine assembly, may occur with the sealing head 157 pivoted temporarily into the phantom line position of FIG. 14. At such time, the raised lifting platform 137 and nest 34B will act to seal the vacuum chamber 32 from the cavity 159. The same magazine assembly 162, after loading, or another, previously loaded magazine assembly may be replaced in the cavity 159, e.g., onto dowels 173,173. The sealing cover 157 may then be pivoted into sealing position and the controlled environment reestablished in the air-lock cavity 159, prior to lowering the lifting platform 137 to its normal rest position beneath the lower turntable 34.

The Sealing Station 41

Figure 4:
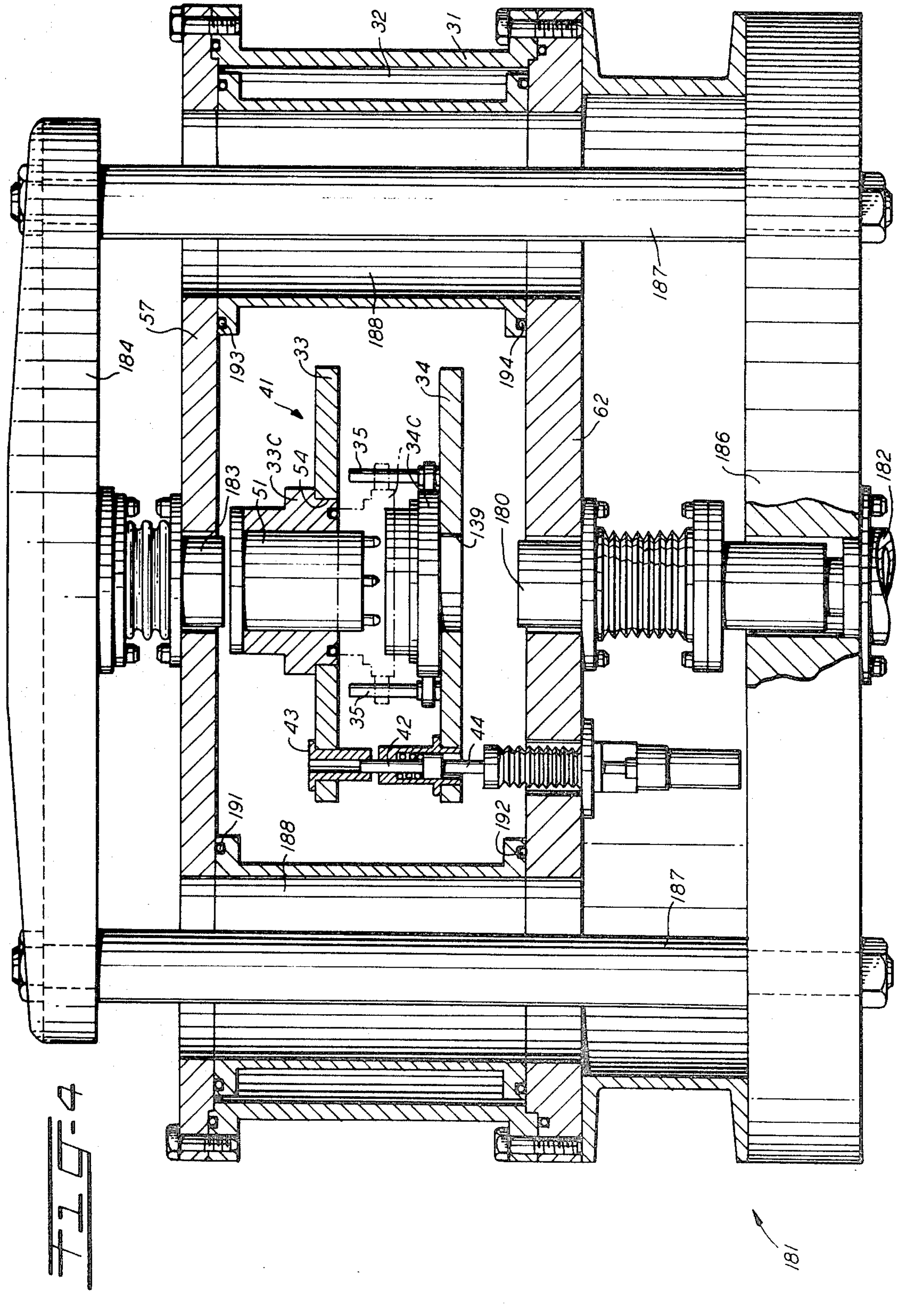
FIG. 4 is a right side elevational view, taken partly in section along the line 4—4 in FIG. 1, depicting a sealing station located within the vacuum chamber of the apparatus.

A number of sealing mechanisms associated with the sealing station 41 are illustrated in FIG. 4. A ram 180 of a press 181 is mounted beneath the lower turntable 34 at the station 41. The ram is connected to be moved upwardly from the position shown in FIG. 4 by a fluid cylinder assembly 182. A stationary anvil 183 of the press is mounted above the upper turntable 33 in vertical alignment with the ram 180. The stationary anvil 183 is fixed to a rigid cross-member 184 which is joined to a platen 186 of the press by four posts 187,187 (see also FIG. 1). In order that the posts 187, 187 may be positioned as close to each other as possible, for the sake of structural rigidity, the posts are located in passageways 188,188 which pass directly through the vacuum chamber 32. The passageways are sealed from the vacuum chamber by ring seals 191,192, 193 and 194.

Figure 5:
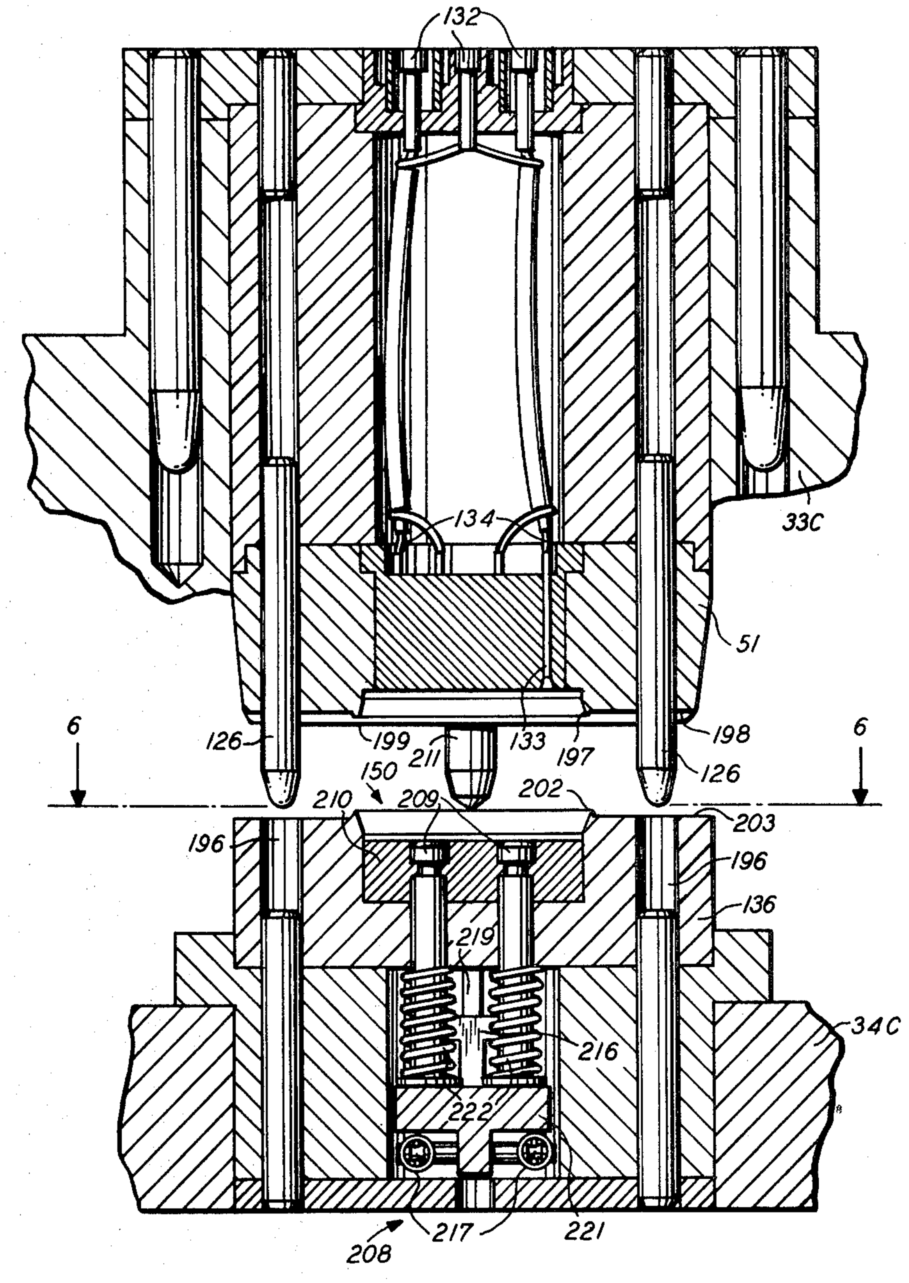
FIG. 5 is vertical elevational view, taken partly in section also along line 4—4 of FIG. 1, showing upper and lower die members for sealing the treated articles within the vacuum chamber of the apparatus.

Referring now also to FIG. 5, the mechanisms located at the sealing station 41 are to be operated only when an upper die 51 in an upper turntable nest, e.g., 33C and a lower die 136 in a lower turntable nest, e.g., 34C are aligned between the anvil 183 and the ram 180. At such time, the ram 180 will be raised, elevating the lower die 136 into contact with the upper die 51 with the dowels 126,126 of the upper die entering clearance apertures 196,196 in the lower die.

Figure 7:
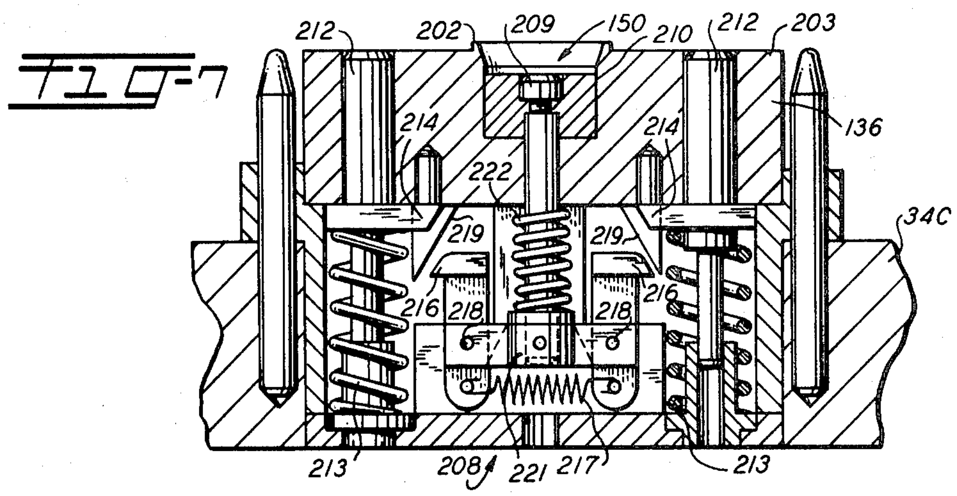
FIG. 7 is a side elevational view, taken partially in section along the line 7—7 in FIG. 6, further illustrating the lower die member.

A generally rectangularly shaped ridge 197 (FIG. 5) projects downwardly from a lower surface 198 of the upper die 51. A bottommost stopping surface 199 of the upper die 51 is disposed beneath the ridge 197. The ridge 197 is shaped to engage the rectangular flange 201 (FIG. 8) of the top cover 22 in the nest 33C around the entire periphery of the flange 201. A similar ridge 202 (FIGS. 5–7) projects upwardly from an upper surface 203 of the lower die 136 in alignment with the ridge 197. The ridge 202 is shaped to engage the rectangular flange 204 (FIG. 8) of the bottom cover 23 in the nest 34C around the entire periphery of the flange 204. The pressure exerted along the aligned ridges 197 and 202 upon movement of the ram 180 toward the anvil 183 will be sufficient to cold weld the flange 201 of the top cover 22 to the flange 204 of the bottom cover 23 so as to seal between the covers 22 and 23 a treated crystal plate 24. A pair of peripheral indentations 206 and 207 (FIG. 8) will be formed in the flanges 201 and 204, respectively, along a a generally rectangular weld line corresponding to the shape of the aligned ridges 197 and 202. Contact between the stopping surface 199 (FIG. 5) of the upper die 51 and the upper surface 203 of the lower die 136 will limit the force applied along the ridges 197 and 202, as well as the depth of the indentations 206 and 207.

A stripper mechanism 208 (FIGS. 5 and 7) is located in the lower die 136. The stripper mechanism includes a pair of spring-loaded plungers 209,209 and a plunger block 210 for stripping the finished article 21 from the lower die 136 after the sealing operation, as the ram 180 is lowered into the position depicted in FIG. 4. During sealing, a pair of pusher members 211,211 (FIG. 5) on the upper die 51, which also serve as die aligning elements, will have pushed two follower members 212,212 (FIG. 7) in the lower die 136 downwardly against the force of a pair of springs 213,213. Thus, beveled portions 214,214 of the follower will have been moved downwardly into a locked position held beneath two beveled fingers 216, 216. The beveled fingers are biased by a spring 217 to pivot outwardly about respective pivot pins 218,218 when not cammed inwardly either by downward movement of the beveled portions 214,214 or by upward movement of the beveled fingers into contact with fixed camming surfaces 219,219 of the lower die 136. As the two dies are separated, the springs 213,213 associated with the follower members 212,212 will lift the follower members, the beveled portions 214,214 the beveled fingers 216,216 the plungers 209,209, which are fixed to a mounting block 221 carrying the beveled fingers, and the plunger block 210. The entire sealed monolithic crystal filter assembly 21 will be driven upwardly in a stripping operation by the rising plunger block 210, and will thereafter be carried by the upper die 51 with the crystal plate 24 contacting the test leads (not shown) positioned within passages 133,133. Meanwhile, the upwardly moving beveled fingers 216,216 will be cammed together by contact with the fixed camming surfaces 219,219 releasing the beveled portions 214,214 of the follower members 212,212 and then being driven downwardly by the springs 222,222 associated with the plungers 209,209. The rest position of FIG. 7 will, thus, be reassumed.

The Operation of the Apparatus

In discussing the operation of the apparatus illustrated in the drawing, the assumption is made that a relatively large number of sealed, monolithic crystal filter assemblies are presently undergoing manufacture. Accordingly, the automatic loading station 39 is being employed to load bottom covers 23 automatically into successively indexed nests 34A–34C in the lower turntable 34, the manual loading station 38 remaining in an idle condition. It is assumed, further, that, at the present moment, the bottom cover magazine and feeding assembly 162 (FIG. 14) is fully loaded with bottom covers 23, that the magazine 108 (FIG. 12) is fully loaded with pellets of the treating material and that the air-lock cavities 68 (FIG. 9), 148 (FIG. 13), and 159 (FIG. 14) are all sealed at their respective ends most distant from the vacuum chamber 32.

Turning to FIGS. 9–11, a control system (not shown) of conventional design is now operated to energize, in succession, the fluid cylinder assemblies 53, 72 and 88 at the loading and unloading station 36. The lifting platform 52 and the nest, e.g., 33A which is presently in the station 36 are first raised into the position of FIG. 9, sealing the air-lock cavity 68. The sealing head 66 is thereafter raised, whereupon the fingers 82 are moved radially inwardly and then upwardly by the levers 73,73 gripping and lifting, into the phantom line position of FIG. 9, an upper die 51 carrying a previously completed, monolithic crystal filter assembly 21. The lifted upper die is thereupon pivoted by the pusher roller 87 (FIGS. 10 and 11) into the phantom line position of FIG. 11.

The completed article 21 may now be removed from the upper die 51 in the readily accessible, pivoted position. A new top cover 22, carrying an untreated crystal plate 24, is then inserted into the upper die. A sequential reversal of the operations of the fluid cylinder assemblies 88 and then 72 is next initiated, by an operator or by conventional control mechanisms, to return the mechanisms at the loading and unloading station 36 to the condition of FIG. 9. The controlled environment is again established in the air-lock cavity 68, whereupon the fluid cylinder 53 is operated to lower the lifting platform 52, through the aperture 54. Thus, the nest 33A and the upper die 51 are placed onto the upper turntable 33 at the bottom of the columns 35,35 preparatory to an indexing operation of the upper turntable which will move the nest 33A to the crystal treating station 37.

Meanwhile, as shown in FIGS. 3 and 12, another nest, e.g., 33B is located in the crystal treating station 37 above the collimator 91. The nest 33B supports another upper die 51 which mounts a top cover 22 carrying a crystal plate 24. During the performance of the loading and unloading operations at the station 36, the crystal plate 24 associated with the nest 33B undergoes a treating operation at the crystal treating station 37.

The crystal treating operation commences as the resistance heater is energized and begins to vaporize a pellet of treating material in the boat 93. The linkage 122, simultaneously, acts to raise the masking assembly 121 to place the mask 123 over the crystal plate 24. The shutter 92 is then withdrawn from the collimator-blocking position of FIGS. 3 and 12, causing crystal treating vapor to pass along the collimator 91 and be deposited onto selected, unmasked areas of the crystal plate.

Vapor plating continues until the testing and control equipment (not shown) coupled to the electrical probes 131,131 senses that a required condition has been attained, i.e., that desired frequency response characteristics have been imparted to the crystal plate 24 associated with the nest 33B. At this time, the shutter 92 is thrust quickly back into the blocking position of FIGS. 3 and 12 in order to terminate rapidly the vapor deposition operation. The masking assembly 121 is then returned to its FIG. 12 position as current application to the resistance heater is ceased, preparatory to an indexing operation of the upper turntable 33 which will move the nest 33B into the sealing station 41.

Simultaneously with the occurrence of the described operations at the stations 36 and 37, a bottom cover loading operation is taking place at the automatic loading station 39. The pivotable sealing head 157 at the automatic loading station is presently in the closed position depicted in solid lines in FIG. 14, sealing the vacuum chamber 32 and the bottom cover magazine and feeding assembly 162 from the surrounding atmosphere.

The fluid cylinder assembly 138 is first operated in conventional manner by the control system (not shown) to raise into the position shown in FIG. 14 the lifting platform 137, the nest, e.g., 34B which is presently in the station 39, and the lower die 136 carried by the nest 34B. Next, the drive motor 164 is operated to rotate the lead screws 163,163 each through a single rotation. Each bottom cover 23 in the magazine assembly 162 is, thus, fed downwardly by one position. The bottommost cover 23, is, meanwhile, pressed firmly into retention position in the lower die 136 in the nest 34B by the camming surfaces 169,169 located at the bottoms of the lead screws.

With a bottom cover 23 now inserted into the lower die 136 in the nest 34B, the fluid cylinder 138 is operated to lower the lifting platform 137 through the aperture 139 beneath the nest 34B. The nest 34B, thus, moves downwardly along the guide columns 35,35 into a lowest position of the nest on the lower turntable 34, preparatory to an indexing operation of the lower turntable which will move the nest 34B into the sealing station 41.

At the same time as the described operations are taking place at the stations 36,37 and 39, a sealing operation is occurring at the sealing station 41 (FIGS. 4 and 5). An upper die 51 and a lower die 136 are located in two nests, e.g., 33C and 34C which are aligned between the ram 180 and the stationary anvil 183 of the press 181 at the sealing station.

The fluid cylinder assembly 182 is operated to raise the ram 180 toward the stationary anvil 183. The ram passes through the aperture 139 in the lower turntable 34, lifting the lower die 136 carried by the nest 34C. A top surface of the flange 204 (FIG. 8) on the bottom cover 23 in the lower die engages a bottom surface of the flange 201 on the top cover 22 which is mounted in the upper die 51 carried by the nest 33C. With the flange 204 of the bottom cover resting on the ridge 202

(FIG. 5) of the lower die 136 and an upper surface of the flange 201 on the top cover contacting the ridge 197 of the upper die 51, the rising bottom cover 23 lifts the top cover 22 and the upper die 51. A top surface of the upper die now engages a bottom surface of the stationary anvil 182 (FIG. 4). Continued upward pressure from the ram 180 thereupon forces the dies 51 and 136 toward one another. Preferably, such compression is in two stages. A first, relatively low pressure compression stage is followed by a conventional alignment check. Thereafter, relatively high pressure, e.g., 25 tons/sq. in. may be applied, causing a cold weld to form about the entire rectangular peripheries of the cover flanges 201 and 204 along the ridges 197 and 202 on the two dies. Contact between the surface 198 and 203 (FIG. 5) of the upper and lower die, respectively, prevents any penetration of the ridges 197 and 202 to too great a depth in the flanges 201 and 204. The top cover 22 and the bottom cover 23 are, thus, sealed about a treated crystal plate 24, carried by the top cover 22, to form a finished article 21. Throughout the sealing operation, the treated plate 24 has been exposed only to the controlled environment within the vacuum chamber 32. Moreover, the utilization of a cold weld method of sealing has substantially avoided sealing-caused alterations in the electrical properties of the treated plate, e.g., that which might accompany the use of high temperature bonding methods.

The fluid cylinder 182 is next operated to return the ram 180 to the FIG. 4 position of the ram. The other elements presently at the sealing station 41 reassume their respective positions of FIGS. 4 and 5. An upward movement of the plunger block 210 of the stripper 203 (FIG. 5) and spring loaded pins 212,212 aids in separating the dies 51 and 136, while the sealed, monolithic crystal filter assembly 21 is retained in the upper die 51 in the nest 33C. The upper turntable 33 and the lower turntable 34 may now be indexed to move the nests 33C and 34C into the loading and unloading station 36 and the manual loading station 38, respectively.

Were the apparatus being employed to manufacture a relatively small number of articles 21, the automatic loading station 39 would remain idle and the manual loading station 38 (FIG. 13) would be utilized in its place. A manual loading operation would take place at the station 38, such operation combining certain features of the loading operations occurring at the loading and unloading station 36 and at the automatic loading station 39. The nature of the manual loading operation should be quite clear to an individual with ordinary skill in the art from the previous discussion and will, thus, not be further described.

Operations occurring simultaneously on elements in the different nests 33A–33C and 34A–34C at the different stations 36–39 and 41 have now been described. As the apparatus continues to run, such operations occur successively with respect to the elements in each nest indexed through the successive stations. Thus, a succession of finished articles 21, constituting treated and sealed monolithic crystal filter assemblies, is removed, either manually or by automatic unloading mechanisms (not shown), from a succession of upper dies 51 as each upper die is caused to assume the phantom line position of FIG. 11. The turntable locking mechanisms 42,43,44 (FIGS. 1 and 4) are after each successive indexing operation.

Whenever the treating material in the boat 93 (FIG. 12) becomes depleted during operation of the apparatus, e.g., after each successive blocking movement of the shutter 92 to terminate vapor deposition onto a crystal plate 24, the fluid cylinder assembly 99 is actuated to effect a stroke of the plunger 98. Leftward movement of the peg 116, as viewed in FIG. 12, engages the surface 117 of the slide 111 and drives the slide slightly to the left. A pellet of treating material drops from the aperture 113 in the slide 11, now aligned with the aperture 114, into the repositioned boat 93. Rightward movement of the plunger 98 and the peg 116 then returns the apparatus to the condition shown in FIG. 12, whereupon vapor deposition may again take place. Conventional stop mechanisms (not shown) provide appropriate limit points at each end of the stroke of the plunger 98 to place the slide 111 and the boat 93 in their required reloading and vapor depositing positions.

At such time during operation of the apparatus as either the magazine 108 (FIG. 12) must be loaded with additional pellets of the treating material or the bottom cover magazine and feeding assembly 162 (FIG. 14) must be loaded with additional bottom covers 23, the operation of the apparatus is suspended temporarily. The plunger 98 is displaced to the left, as viewed in FIG. 12, and the auxiliary air-lock assembly 101 is operated to seal the vacuum chamber 32 from the surrounding atmosphere in order to permit reloading of the magazine 108 through suitable access cover (not shown). The cavity 159 (FIG. 14) is sealed from the vacuum chamber 32 at the ring seals 141 and 142 in order to permit reloading of the magazine assembly 162 through the pivoted sealing head 157. The auxiliary vacuum chamber 96 (FIG. 12) and the cavity 159 (FIG. 14) are, of course, each purged by the associated environment control equipment (not shown) after reloading and prior to resumption of communication with the vacuum chamber 32.

It is to be understood that the above-described apparatus is simply illustrative of one embodiment of the invention. Another embodiment might employ ultrasonic sealing mechanisms. Many other modifications may be made in accordance with the principles of the invention.

What is claimed is:

1. In a cold weld bonding device which includes first and second die means for bonding together two members to form an article:

means for reciprocating the two die means to move the two die means together to form the article and to move the two die means apart after the article is formed;

a locking member carried by said first die means;

follower means, carried by said first die means and actuable into a locked condition with respect to the locking member, rendered effective in said locked condition for biasing the locking member in a direction outward from said first die means;

means, carried by said second die means and responsive to a movement together of the two die means, for actuating the follower means into said locked condition; and means, responsive to movement of the biased locking member in said outward direction upon movement apart of the two die means, for engaging the article and driving the article in said outward direction to eject the article from said first die means.

2. In a cold weld bonding device, as set forth in claim 1, said ejecting means further comprising:

means, carried by said first die means and rendered effective after a limited movement of the locking member in said outward direction, for unlocking the follower means from the locked condition with respect to the locking member; and means responsive to the unlocking of the follower means from the locking member for moving the locking member and the article engaging and driving means in a direction opposite to said outward direction.

3. In a cold weld bonding device, as set forth in claim 2: direction opposite to said outward direction.

said locking member comprising a beveled finger biased in a locking direction; and said follower means having a beveled surface positioned to engage the beveled finger upon actuation by the actuating means and to cam the beveled finger opposite to the locking direction so as to latch the beveled surface in said locked condition with the beveled surface displaced beyond the beveled finger and the beveled finger biased back in the locking direction.

4. In a cold weld bonding device, as set forth in claim 3, said unlocking means comprising:

a fixed, beveled surface on said first die means positioned to engage the beveled finger upon a limited movement thereof in said outward direction and to cam the beveled finger opposite to the locking direction until the beveled surface of the follower means is free of the beveled finger.

5. In an apparatus for forming an article between a pair of die means:

means for reciprocating at least one of the dies to thereby move the dies together to form the article and move the dies apart to release the article;

means positioned in one of the dies for driving the article from the dies;

means for moving said driving means to drive the article from said dies;

means for coupling said moving means to said driving means upon moving said dies together; and means for uncoupling said moving means from said driving means upon moving said dies a predetermined distance apart to deactivate said driving means.

6. The apparatus of claim 5 wherein the moving means includes at least one spring which is put into a positive elastic potential energy state upon moving the dies together and releases energy upon moving the dies apart.

* * * * *